United States Patent [19]

Dolby

[11] 4,099,212
[45] Jul. 4, 1978

[54] ROTATING TRANSDUCING HEAD ASSEMBLY

[75] Inventor: Dale P. Dolby, Los Altos, Calif.

[73] Assignee: Ampex Corporation, Redwood City, Calif.

[21] Appl. No.: 729,283

[22] Filed: Oct. 4, 1976

[51] Int. Cl.² .................. G11B 5/52; G11B 21/10; G11B 21/24; G11B 15/60
[52] U.S. Cl. .................................. 360/109; 360/84; 360/108; 360/130
[58] Field of Search .......................... 360/107–109, 360/102–104, 84, 128–130

[56] References Cited

U.S. PATENT DOCUMENTS

| | | | |
|---|---|---|---|
| 3,076,060 | 1/1963 | Horstkorta | 360/107 |
| 3,363,066 | 1/1968 | Prochnow | 360/130 |
| 3,443,039 | 5/1969 | Bygdnes | 360/109 |

Primary Examiner—Alfred H. Eddleman
Attorney, Agent, or Firm—Robert G. Clay; Charles C. Carman

[57] ABSTRACT

A rotating transducing head drum mounts a number of transducer heads for sweeping rotation across the surface of a record medium. The drum includes a shaft or other cylindrical gauge footing at the center, and each head is carried on a mounting element having at least two angled surfaces tangentially engaging the footing at circumferentially spaced generatrices thereof so as to be precisely located in a radial direction. Circumferential and axial locating means are also provided.

6 Claims, 6 Drawing Figures

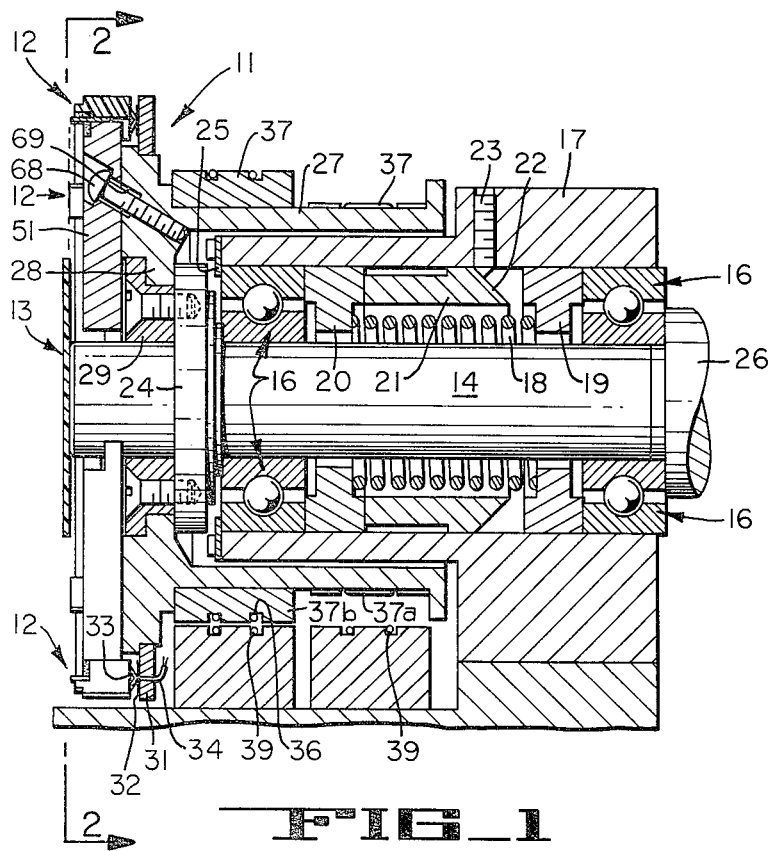
FIG_1
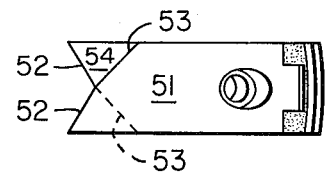
FIG_3
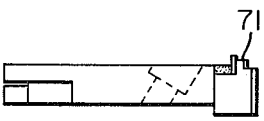
FIG_4
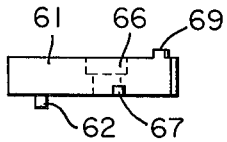
FIG_5
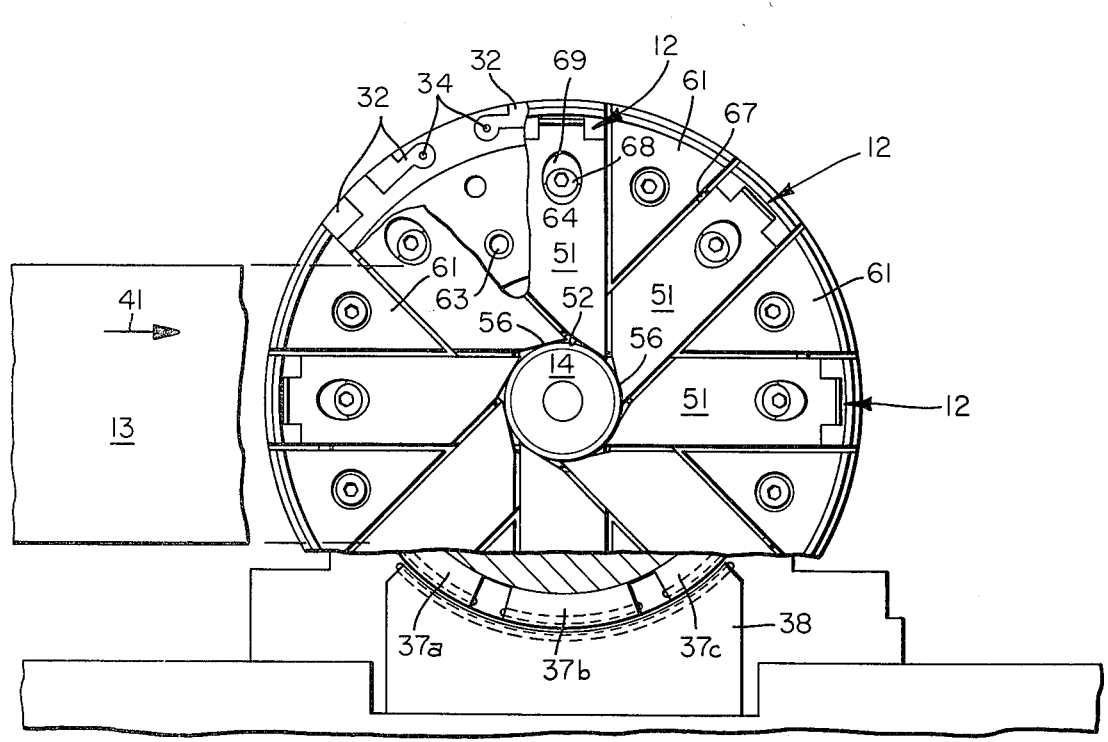
FIG_2

ROTATING TRANSDUCING HEAD ASSEMBLY

CROSS REFERENCE TO RELATED APPLICATION

"Rotating Transducing Head Assembly", Ser. No. 729,282, filed Oct. 4, 1976, by Dale P. Dolby.

BACKGROUND OF THE INVENTION

This invention relates to rotating transducing head assemblies, and particularly to such assemblies requiring a large number of heads that must be precisely mounted to fine tolerances in both radial and circumferential directions.

In the magnetic tape, disc and sheet transducing art, it is frequently desired to mount a large number of transducer heads upon a rotating drum for successive sweeps across the record medium. When the number of heads is three or more, there is difficulty in providing sufficiently precise location of the heads on the drum, together with ready interchangeability in the field. If the heads are carefully gauge-mounted in the factory, they are usually not field-replaceable, or at least not without disturbing the precision of the factory mounting, and so the entire assembly must be returned to the factory for the replacement of even one transducing head.

Accordingly, it is an object of the present invention to provide a precision mounted field-replaceable head for rotating transducing head drums.

DESCRIPTION OF THE DRAWINGS

FIG. 1 is a partly broken-away elevation view of a rotating transducer head assembly in accordance with the invention;

FIG. 2 is a partly broken-away elevation view taken along the plane of lines 2—2 of FIG. 1;

FIG. 3 is a separate view of a portion of FIGS. 1 and 2 showing further detail of the apparatus;

FIG. 4 is a further view of the apparatus of FIG. 3; and

FIG. 5 is a separate view of another portion of the apparatus of FIGS. 1 and 2.

DETAILED DESCRIPTION

Referring now to the drawings, and particularly to FIG. 1 thereof, there is shown a rotating transducing head drum 11 for mounting a number of magnetic transducing heads 12, in this case eight, at angular intervals of 45°, for successive sweeps across a magnetic tape 13. In the illustrated apparatus the tape is held flat by means not shown, and the axis of drum rotation and the direction of head projection from the drum is normal to the plane of the tape. However, as will be seen, the invention is equally applicable to more common configurations such as drums with radially outwardly projecting heads and tape that is guided with the tape length parallel to the drum axis and the width cupped arcuately around the drum periphery.

A shaft 14 drives the drum 11, and is in turn driven by a drive means such as a motor, not shown. The shaft 14 is mounted between a pair of ball bearings 16 mounted within a housing 17, the outer bearing races being loaded axially apart by means of a helical compression spring 18 and bushings 19, 20; and the bushing 20 being particularly retained by locking sleeve 21 having a conical end 22 engaged by conical ended set screw 23 anchored in the housing, and by a detachable ring 25 on the end of the housing 17. The inner races of the bearings 16 are retained on shaft 14 between a collar 24 integral with the shaft and an enlarged detachable portion 26 of the shaft.

The drum 11 is formed as a hollow cylindrical member 27 with one closed end 28, which is secured upon the shaft 14 by means of a collar 29 that is bolted to collar 24 and is shaped to clamp the end 28 of the drum between itself and collar 24.

The Transformer Coupling

A printed-circuit board 31 is also mounted on the drum 11 and supports contacts 32 (two for each head) for engaging a pair of contacts 33 extending from the respective head. For each head, from the contacts 32 extend wires 34 (shown only for the lowest head 12) which are coupled to the ends of a coil 36 nestled in grooves in the surface of a rotating signal-coupling transformer half 37. Thus, in the illustrated apparatus, there is one rotating transformer half 37 for each of the eight heads 12. There are, however, only two stationary transformer halves 38, in which coils 39 are mounted, coupled in turn to electronic apparatus well-known in the art and not here shown, for transmission of recording signals to, and playback signals from, the heads 12. The reason for having two stationary transformer halves as a minimum is as follows. The tape is just wide enough to bridge two heads 12 at a time, and is moving longitudinally in the direction of arrow 41, so that just as one head is leaving the tape at the end of a recorded transverse track, the next head in sequence is just entering the tape to begin recording or reproducing from the next track. For a moment the two heads are both upon the tape at opposite sides thereof, and at such time the (television) signal is in a blanking zone portion thereof, and the signal at that instant is switched, as by well-known means not here shown, from the first head, which is leaving the tape, to the second head, which is entering the tape. Thus, at least during this short overlap period, the signal being transmitted to or from the first head and its rotating transformer must be transmitted to or from one stationary transformer substantially concurrently with the signal to or from the second head and its rotating-transformer and a second, separate stationary transformer. To provide this switching overlap therefore requires two stationary transformer halves at a minimum. A minimum of two rotating transformer halves can also be used if all of the "odd" heads are coupled in parallel to one of the rotating transformer halves and all of the intervening or "even" heads are coupled in parallel to the other rotating transformer half. However, in such case the heads that are not at a given moment tracking the tape may pick up stray signals in the environment, or background noise; and it is therefore preferred to provide one rotating transformer half for each head, together with a minimum of two stationary transformer halves.

Broadly stated, if N is the number of heads, sweeping the tape upon each revolution of the head drum in K successive sets of P successive sweeps per set, then the minimum number of stationary transformer halves is P. Thus, with N=8 heads, as shown, sweeping the tape in K=4 sets of P=2 sweeps per set, the minimum number of stationary transformer halves is P=2. The same number P=2 would be required for N=4 heads sweeping the tape in K=2 successive sets of P=2 sweeps per set. For N=2, K would have to be 1 and P=2, so that there is no possible saving in the number of stationary transformer halves, so the invention contemplates only values for N in which N>2. Also, there can be no saving when N is any prime number, for example, when N=3 or N=7 for the odd heads on one revolution must be the even heads on the next revolution and to get around this problem no less than N stationary transformer halves would be needed. A saving is possible however when N is any non-prime though odd integer such as 9. When N=9, K may be 3 and P=3. What is required is that K and P must be aliquot parts of N, and N is the product of K and P, all being integers, of course.

In the illustrated apparatus, the stationary transformer halves 38 are located beneath the drum 11 (at 6 o'clock in FIG. 2) while the heads 12 sweep the tape (at about 9 o'clock in FIG. 2), so it follows that the heads must be connected so that each head when it is at 9 o'clock is coupled to the rotating transformer half 37 that is at 6 o'clock; and the odd-numbered rotating transformer halves (e.g., such as halves 37a, 37c) are arranged in an arcuate array co-axial with the drum, but upon a different (in this case axially-spaced) circle than the acruate array corresponding with the even-numbered rotating transformer halves such as half 37b.

The Head Mounts

It will be noticed that each of the heads 12 is mounted on a mounting member 51, which engages the shaft 14 with a dovetailed radially inward end. The shaft at this region is formed as a precision gauge cylindrical surface for the purpose of locating the heads 12 accurately in radial dimension while permitting accurate adjustment of the arcuate or circumferential position of the head by means more fully described below. The dovetail inner end of each member 51 is formed with two re-entrantly angled surfaces 52, each of which is offset axially from the other so as to tangentially engage the cylindrical shaft 14 at spaced generatrices thereof. Each surface 52 continues along a shoulder portion 53 which defines, along with the backside 54 of the opposite dovetail, a nesting cavity so that more than two members 51, and in this case eight, can be distributed around the shaft 14 so as to overlap one another. This overlapping relationship enables the generatrices 56 (e.g., FIG. 2), at which the members tangentially engage the shaft, to be the more widely spaced angularly, and therefore to provide a more solid and accurate location of the heads 12 in their radial dimensions; yet the members 51 are still free to slide circumferentially on shaft 14 in response to arcuate adjustments now to be described.

Positioned between each adjacent pair of members 51 is a pie-shaped member 61 having a pivot pin 62 formed near the apex thereof (FIG. 5) on the side thereof facing the drum 11. The drum has a corresponding pivot socket 63 (FIG. 2 broken away upper portion) into which the pin 62 fits snugly but pivotably. Each element 61 is secured to the drum 11 by means of a bolt 64 threaded into the drum but only loosely circumscribed by an oversize bore 66 in the member 61. Thus the member 61 is capable of limited pivoting motion about pin 62 and socket 63 when the bolt 64 is loosened, but is locked in any selected position on the drum when the bolt 64 is tightened. Each element 61 has a lateral boss 67 engaging and angularly positioning the adjacent (clockwise) side of a member 51, which is then locked to the drum by means of a bolt 68 likewise threaded into the drum 11 but circumscribed only loosely by an oversize bore 69 permitting limited angular adjustment of the member 51 when the bolt 68 is loosened, but locking the member 51 to the drum 11 when the bolt 68 is tightened. The bolt 68 is directed not only toward the drum but also radially inward at an angle to the drum to ensure clamping of the member 51 against the shaft 14 as well as against the drum 11. A ridge 69 is formed on the element 61 as a fairing or circumferential continuation of a protective ridge 71 formed on the head mount 51 to protect the head 12.

With this arrangement, the pie-shaped members 61 can be permenently secured in the factor, while the mounting members 51 are easily replaceable in the field, for interchangeability without disturbance of the accuracy of mounting.

Thus, there has been described a rotating transducing head drum that mounts a number of transducer heads for sweeping rotation across the surface of a record medium. The drum includes a shaft or other cylindrical gauge footing at the center, and each head is carried on a mounting element having at least two angled surfaces tangentially engaging the footing at circumferentially spaced generatrices thereof so as to be precisely located in a radial direction. Circumferential and axial locating means are also provided.

I claim:

1. In a magnetic recording-reproducing machine of the type in which a plurality of magnetic transducer heads are mounted upon a drum for sweeping rotation across the surface of a magnetic record medium, a head mounting assembly comprising:

a gauge footing for mounting said heads, said footing being formed as a cylindrical element coaxial with, adjacent to and of smaller diameter than said drum;

a mounting element for each of said heads, each mounting element being arranged to fit upon said drum with a first portion thereof engaging said cylindrical footing and a second portion thereof carrying the corresponding one of said heads for projection from said drum to engage said record medium;

each of said head mounting elements being formed with a plurality of angled surfaces at said first portion for tangentially engaging said cylindrical gauge footing at circumferentially spaced generatrices thereof;

each of said mounting elements being cut away to permit nesting of said mounting elements around said cylindrical footing with said heads all in the same plane normal to the axis of said drum; and circumferential and axial locating means for securing said mounting elements to said drum.

2. The combination recited in claim 1, wherein each of said head mounting elements is formed with a V-shaped notch at said first portion thereof with the generally confronting faces of said notch defining said angled surfaces for tangentially engaging said cylindrical footing.

3. The combination recited in claim 2, wherein the portions of each head mounting element that remain on either side of said notch terminate as a pair of triangular extensions of said mounting element, each of said extensions having a thickness from front to back of substantially half the thickness of said mounting element, the front surface of one extension being continuous with the front surface of said mounting element and the front surface of the other extension being continuous with the back surface of said mounting element.

4. The combination recited in claim 3, wherein each mounting element is secured to said drum by a bolt passing loosely through the mounting element in a loosely conforming bore and threaded into said drum in an axial plane thereof but at an angle that is acute to said drum on the radially outward side thereof, said element being secured by clamping action of the bolt head.

5. The combination recited in claim 4, wherein said circumferential locating means for said head comprises:
a pie-shaped member mounted on said drum between adjacent head mounting elements and having a guage bore project on one side thereof for engaging and for precisely locating and ejecting the circumferential position of the adjacent head.

6. The combination recited in claim 5, wherein said pie-shaped member has a pivot pin extending from the back side near the apex thereof and into a conforming recess in said drum, and is secured to said drum by a second bolt passing loosely through the pie-shaped member in a loosely conforming bore and threaded into said drum.

* * * * *